United States Patent [19]

McWhorter et al.

[11] Patent Number: 4,479,362

[45] Date of Patent: Oct. 30, 1984

[54] CRYOGENIC COOLING OF PNEUMATICALLY TRANSPORTED SOLIDS

[75] Inventors: Thomas E. McWhorter, Chesire, United Kingdom; Barry J. Halper, Allentown, Pa.

[73] Assignee: Air Products and Chemicals, Inc., Allentown, Pa.

[21] Appl. No.: 448,560

[22] Filed: Dec. 10, 1982

[51] Int. Cl.³ ............................................. F25D 13/06
[52] U.S. Cl. ......................................... 62/63; 62/48; 62/55; 62/70; 62/514 R; 406/47
[58] Field of Search ............ 62/48, 55, 70, 63, 514 R; 406/46, 47

[56] References Cited

U.S. PATENT DOCUMENTS

| | | | |
|---|---|---|---|
| 3,210,131 | 10/1965 | Booth et al. | 302/53 |
| 3,583,172 | 6/1971 | Koudelka et al. | 62/70 |
| 3,672,182 | 6/1972 | Stowasser et al. | 62/98 |
| 3,720,201 | 5/1973 | Lefever | 62/55 |
| 4,206,610 | 1/1980 | Santhanam | 62/55 |
| 4,300,355 | 11/1981 | McWhorter et al. | 62/48 |
| 4,305,257 | 12/1981 | Kneeland | 62/48 |

Primary Examiner—Ronald C. Capossela
Attorney, Agent, or Firm—Mark L. Rodgers; E. Eugene Innis; James C. Simmons

[57] ABSTRACT

The present invention is an improved process for cooling cement which comprises injecting liquid nitrogen into a pneumatic transport line used to convey the cement.

3 Claims, 1 Drawing Figure

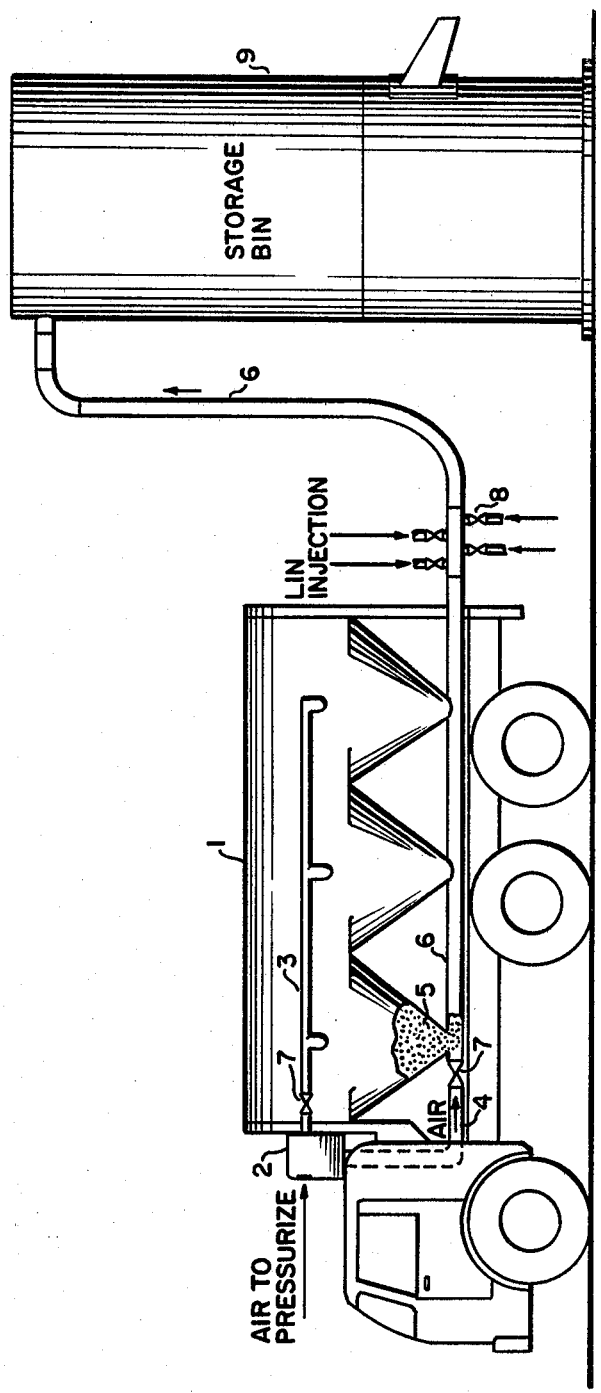

CRYOGENIC COOLING OF PNEUMATICALLY TRANSPORTED SOLIDS

TECHNICAL FIELD OF THE INVENTION

The present invention relates to the cooling of pneumatically conveyed finely divided solids using a cryogenic fluid.

BACKGROUND OF THE INVENTION

Many powdered and granular solids are produced by a grinding and/or calcining process. The heat generated by this process is transferred to the solid causing a rise in temperature. In many instances it is undesirable to use or store a solid at elevated temperatures.

For instance, in the concrete industry the temperature of the poured concrete is often critical. In general, the cooler the concrete when poured, the stronger it will be. Many construction projects require that the concrete be poured at or below a certain specified temperature. This is especially true during the summer months for large construction projects such as building dams and foundations for fossil fuel and nuclear power plants. The concrete temperature can be controlled by controlling the temperature of its components—cement, aggregate and water.

Currently, concrete is cooled by cooling the water prior to its use in the concrete. Stowasser, U.S. Pat. No. 3,672,182 discloses injecting liquid nitrogen into the water which is to be mixed with the cement to form concrete.

U.S. Pat. Nos. 4,300,355 and 4,305,257 disclose in-line slush making processes. These references teach injecting a cryogenic fluid into a flowing liquid stream to form a flowable liquid-solid mixture. These references teach that these processes can be used to treat the water component in a concrete making process.

Additionally the aggregate may also be cooled. This is done by spraying water to effect evaporation cooling. This method cannot achieve sufficient cooling even in conjunction with chilled water or ice. In many cases therefore, an additional or alternate method of cooling may be required. In these cases, it may be desirable to cool the cement.

Previously, cement was cooled by the manufacturer using water jacketed vessels. This process often proved unsatisfactory however since the extent to which the cement can be cooled is limited. Additionally, attempts were made to cool the cement by injecting liquid nitrogen directly into the storage bin to fluidize the cement. This fluidization alternative however is not practical since a complex diffuser system is necessary to ensure fluidization. This requires major modifications to an existing system and a large capital investment. Also, because of channeling, there results a great variation in the cement temperature. This presents a logisitical problem to the batch plant operator in trying to meet concrete temperature specifications. Channeling along the sides of the bed along with the low temperature of the exiting gas also exposes the silo to cryogenic temperatures.

Since these processes often result in insufficient cooling, it becomes necessary for the concrete producer to provide additional cooling to meet his specific temperature requirement. U.S. Pat. No. 3,583,172 teaches a method of cooling the concrete by spraying or injecting a cryogenic liquid directly onto or into the concrete mixture while it is being mixed. This method, however, is inefficient and exposes the concrete and the truck itself to cryogenic temperatures.

SUMMARY OF THE INVENTION

The present invention comprises a process of cooling finely divided solids by injecting a cryogenic fluid into a pneumatic transport line used to convey the solid particles. More particularly it relates to an efficient and easy process to cool cement during transport to a storage vessel, to a temperature cool enough so that it is no longer necessary for the final concrete user to provide additional cooling during or after mixing.

BRIEF DESCRIPTION OF THE DRAWING

The single FIGURE is a schematic representation of the application of the claimed process in a typical cement transfer operation.

DETAILED DESCRIPTION OF THE INVENTION

The present invention provides for a process of cooling finely divided solids while they are being transported within a pneumatic medium. This process involves injecting an inert cryogenic fluid, preferably liquid nitrogen, directly into the pneumatic pathway.

This process has important adaptation in the cooling of cement. When cement is delivered to a storage bin for temporary storage prior to use, it is usually between 100° F. and 130° F., while at certain times it may be up to 150° F.

The single FIGURE shows the general operation of the claimed invention as it relates to the unloading of cement. Cement is delivered to the storage site by a cement truck having one or more storage bins 1. The cement is off loaded using an air blower 2 mounted on the delivery truck. This air blower 2 is connected to an air line 3 located near the top of the truck and also to an air line 4 located at the bottom of the truck. Air is initially used in the top line 3 to pressurize the storage bins on the truck to about 10 to 15 psig. This forces the cement 5 into a pneumatic transfer line 6 which is then conveyed with additional air from the blower 2 through the bottom line 4. The flow of air to pressurize the bins and transport the cement can be controlled by valves 7 located in each line. Injection nozzles 8 used for supplying a cryogenic fluid are located along the pneumatic transport line 6. It should be noted that while the drawing shows four nozzles being employed, any number from one or greater can be used. When the cement is being transported through the line, a predetermined amount of liquid nitrogen or other cryogenic fluid is injected through the nozzles, thereby cooling the cement to the desired temperature. The cooled cement is transported through the pneumatic line to a storage silo 9 where it is stored until it is used. The final temperature of the cement can be measured by installing thermocouples (not shown) in the transfer line. In order to get an accurate temperature reading, these thermocouples should preferably be located at a point in the transfer line as close to the storage bin as possible.

In order to obtain effective cooling, the injection site should be located at a point along the delivery line such that the distance of the line from the truck, or other source of the finely divided solids, is no greater than about 50% of the distance of the line from the injection site to the storage silo or other delivery point. Preferably, and in order to maximize cooling, this distance from the initial delivery point to the injection site should be about 1% to 10% of the distance from the injection site to the final delivery point. This allows for sufficient contact time between the cement and the fluid which is necessary for heat transfer to occur between the two.

Since in some instances the delivery line extends inside the delivery truck, it is possible that the injection site can be located at a point inside the truck also.

The method of injecting the cryogenic fluid has to provide sufficient mixing of the fluid and the cement. Typically, in a pneumatic system the solid tends to flow in slugs. Heat transfer between a slug and the fluid is relatively slow while between a particle and the fluid it is almost instantaneous. Therefore, to maximize the efficiency of cooling, the injection of the fluid should disperse these slugs into discrete particles. This is accomplished by spraying the fluid into the medium at a point in the transfer line as described above.

The rate of injecting the cryogenic fluid will determine the amount of cooling that is available. In order to achieve this cooling, the residence time in a transport line must be long enough to allow for the heat transfer. This is due to the fact that not all of the cement will be broken up into discrete particles. The residence time is controlled by the diameter and the length of the transfer line.

The process described in the claimed invention can be fully automated. All that is required is that the system be activated prior to the arrival of a cement truck. Once activated, the system is able to sense the flow of cement and start the liquid nitrogen flow. Once the cement unloading is completed, or while the truck switches bins, the liquid nitrogen flow automatically stops. Liquid nitrogen will not flow unless there is a significant flow of cement. Prior to the cement flow, and for a short while after, a gas purge will come on to ensure that there is no plugging of the liquid nitrogen injection nozzles.

Efficiencies of greater than 90% are realized using this system, thereby making it economically viable. Liquid nitrogen consumption is equivalent to 1.0 gallon per degree cooling per cubic yard of concrete. It was found that about a 9° F. drop in cement temperature results in a 1° F. drop in concrete temperature for a typical mix. Therefore, by controlling the liquid nitrogen injection rate, the cement temperature can be controlled in accordance with the final desired concrete temperature.

Also, since this type of injection system ensures complete mixing of the cement and liquid nitrogen, cold areas do not form on the transfer line. In fact, pipe skin temperatures remain close to the mass average stream temperatures. This is important because the conventional transfer pipe used in this type of operation is not insulated and becomes brittle when it reaches temperatures of less than about −20° F. Preventing cold spots on the transfer line therefore saves the capital cost of installing more durable equipment.

After the cement has been cooled, it is held in the storage silo until needed. Should its temperature increase, the effectiveness of the initial cooling would be diminished. This does not pose a problem however, since the cement is usually only cooled to near ambient temperatures (i.e., to about 100° F. to 80° F.). While this is the usual procedure, it should be realized that this process allows for much greater cooling (i.e., to about −50° F.). In addition, the large mass of cement and its insulating properties prevent its temperature from changing significantly over the usual short storage period.

In summary, the above claimed invention has the following advantages:
(a) since cement is a large heat source for concrete, a 9° F. drop in the cement results in about a 1° F. drop in the concrete;
(b) the dry cryogenic fluid absorbs moisture which otherwise reacts with the cement and reduces its effectiveness;
(c) the system can be automated and controlled to achieve the desired cement temperature;
(d) cooling the cement does not reduce its effectiveness, therefore, a wide range of cement temperatures is possible;
(e) this system can easily be adopted to any concrete batch plant without any major modifications; and
(f) the cement cooling can occur between any two points between which it is pneumatically moved.

In addition to cement, other finely divided solids that are pneumatically transported can be cooled in the same manner. Examples are: coal, bauxite, catalysts, clays, copper, calcines, dolomite, gypsum, lime, limestone, ores, phosphate rock, silica, starch and talc.

The following is an example of the operation of the disclosed invention. This example is illustrative and is not meant to be limiting.

EXAMPLE 1

Field tests were conducted injecting liquid nitrogen into a pneumatic transport line, approximately 80 ft long, connecting a storage bin with a cement truck. The liquid nitrogen was injected into the pneumatic line by 12 spray nozzels located about 20 ft from the beginning of the line. Tests were run on six different trucks. Physically the trucks were divided into three separate bins. As each bin was unloaded, warmer cement was taken out of the middle and cooler cement was taken from the sides. A sudden increase in temperature occurred when a new bin was started. The amount of cooling was controlled by the rate of liquid nitrogen injection. Cooling ranged from 23°–66° F. depending upon the liquid nitrogen flow rates. This resulted in a 2°–7° F. drop in concrete temperature.

TABLE 1

SUMMARY OF DATA FROM FIELD TESTS

| Truck | Initial Cement Temperature (°F.) | Final Cement Temperature (°F.) | Temperature Drop (°F.) | Equivalent Concrete Temperature Drop (°F.) | Cement Cooled (lb) | Unloading Time (min) | LIN Used (ft³) | Efficiency |
|---|---|---|---|---|---|---|---|---|
| 1 | 136 | 114 | 23 | 2 | 31,308 | 45 | 17,677 | 60 |
| 2 | 131 | 65 | 66 | 7 | 52,000 | 70 | 54,646 | 98 |
| 3 | 134 | 78 | 56 | 6 | 51,960 | 58 | 40,221 | 100 |
| 4 | 120 | 81 | 39 | 4 | 52,540 | 55 | 36,380 | 87 |
| 5 | 121 | 94 | 27 | 3 | 30,531[1] | 60 | 17,600 | 71 |

TABLE 1-continued
SUMMARY OF DATA FROM FIELD TESTS

| Truck | Initial Cement Temperature (°F.) | Final Cement Temperature (°F.) | Temperature Drop (°F.) | Equivalent Concrete Temperature Drop (°F.) | Cement Cooled (lb) | Unloading Time (min) | LIN Used (ft$^3$) | Efficiency |
|---|---|---|---|---|---|---|---|---|
| 6 | 117 | 117 | — | — | — | 45 | — | — |

[1]Trucks 1 and 5 - only part of the load was cooled.

Efficiencies measured during specific tests ranged between 60% and 100% with an average efficiency of 92% for the runs in which all of the load was cooled.

These tests also showed that injecting liquid nitrogen into the transport line does not create sufficient back pressure to prohibit the truck from unloading. At maximum injection rates the unloading rates were lowered, but this slight increase in unloading time did not cause any problem.

It was also found that proper design of the liquid nitrogen injection ensures complete mixing of the cement and the liquid nitrogen, which in turn prevents any cold areas from forming on the transport line. This allows the claimed invention to be used with conventional cement loading equipment.

What is claimed is:

1. A process for cooling cement being conveyed in a pneumatic transport line which comprises injecting a cryogenic fluid into said transport line at a point such that the distance of the line from a source of the cement to the point of injection is between 1% to 10% of the distance of the line from the injection site to a delivery point, and whereby said cement is cooled to a temperature between 80° to 100° F.

2. The process in accordance with claim 1 wherein said cryogenic fluid is liquid nitrogen.

3. The process in accordance with claim 1 wherein a thermocouple is installed in said pneumatic line.

* * * * *